United States Patent [19]

Bolie

[11] 3,727,193

[45] Apr. 10, 1973

[54] SIGNAL VECTOR RECOGNITION SYSTEM

[76] Inventor: Victor W. Bolie, c/o School of Electrical Engineering, Oklahoma State University, Stillwater, Okla. 74074

[22] Filed: May 18, 1971

[21] Appl. No.: 144,546

[52] U.S. Cl. ........ 340/172.5

[51] Int. Cl. ........ G06f 7/02

[58] Field of Search ........ 340/172.5

[56] References Cited

UNITED STATES PATENTS

| | | | |
|---|---|---|---|
| 3,440,617 | 4/1969 | Lesti | 340/172.5 |
| 3,504,164 | 3/1970 | Farrell et al. | 340/172.5 |
| 3,191,149 | 6/1965 | Andrews | 340/172.5 |
| 3,267,431 | 8/1966 | Greenberg et al. | 340/172.5 |
| 3,147,343 | 9/1964 | Meyer et al. | 340/172.5 |
| 2,947,971 | 8/1960 | Glauberman et al. | 340/17.25 |

*Primary Examiner*—Gareth D. Shaw
*Attorney*—Head & Johnson

[57] ABSTRACT

This invention is directed to apparatus for the automatic categorization of any N-element stimulus pattern which can be represented by a plurality of analog voltages. It comprises memory means for storing in retrievable form a plurality of N-element reference vectors and a plurality of N-element tolerance vectors which represent the degree of uncertainty of the corresponding plurality of reference vectors. Comparison means are provided to determine the degree of similarity between the stimulus vector and a selected one of the reference vectors. The plurality of comparisons between the stimulus vector and the various reference vectors are displayed in the form of an output response vector. Means are also provided for determining which of the many reference vectors comprise the most orthogonal subset.

8 Claims, 9 Drawing Figures

INVENTOR.
VICTOR W. BOLIE

BY Head & Johnson

ATTORNEYS

INVENTOR.
VICTOR W. BOLIE

BY *Head & Johnson*

ATTORNEYS

INVENTOR.
VICTOR W. BOLIE

BY Head & Johnson

ATTORNEYS $$P_5(x) = (1+a_1x)(1+a_2x)(1+a_3x)(1+a_4x)(1+a_5x)$$

$$= \prod_{i=1}^{5} (1+a_i x) = 1 + \sum_{j=1}^{5} b_j x^j$$

$$b_1 = \sum_{i=1}^{5} a_i$$

$$b_2 = \sum_{j=2}^{5} \sum_{i=1}^{j-1} a_j a_i$$

$$b_3 = \sum_{k=3}^{5} \sum_{j=2}^{k-1} \sum_{i=1}^{j-1} a_k a_j a_i$$

$$b_4 = \sum_{l=4}^{5} \sum_{k=3}^{l-1} \sum_{j=2}^{k-1} \sum_{i=1}^{j-1} a_l a_k a_j a_i$$

$$b_5 = \sum_{m=5}^{5} \sum_{l=4}^{m-1} \sum_{k=3}^{l-1} \sum_{j=2}^{k-1} \sum_{i=1}^{j-1} a_m a_l a_k a_j a_i$$

FIG. 6

```
100 FORMAT (16X, 16(1X, F3.1))
200 FORMAT (10X, F5.3 , 1X, 16(2X , I2))

    READ 100, (V(I,J) , I= 1,16), J= 1,64)

    DO 400   J= 1,64
    S = 0.000
    DO 300   I = 1,16
300 S = S +  (V(I,J)** 2)
400 V(I,J) = V(I,J) / SQRT (S)

    DO 600 K(16) = 16, 64
    DO 600 K(15) = 15, (K(16) - 1)
    DO 600 K(14) = 14, (K(15) - 1)
    DO 600 K(13) = 13, (K(14) - 1)
    DO 600 K(12) = 12, (K(13) - 1)
    DO 600 K(11) = 11, (K(12) - 1)
    DO 600 K(10) = 10, (K(11) - 1)
    DO 600 K( 9) =  9, (K(10) - 1)
    DO 600 K( 8) =  8, (K( 9) - 1)
    DO 600 K( 7) =  7, (K (8) - 1)
    DO 600 K( 6) =  6, (K (7) - 1)
    DO 600 K( 5) =  5, (K (6) - 1)
    DO 600 K( 4) =  4, (K (5) - 1)
    DO 600 K( 3) =  3, (K (4) - 1)
    DO 600 K (2) =  2, (K (3) - 1)
    DO 600 K (1) =  1, (K (2) - 1)
    DO 500 J = 1, 16
    DO 500 I = 1, 16
500 U(I,J) = V(I,K(J))
    D = DETERMINANT (U(I,J))
    Q = ABS (D)
600 PUNCH 200, Q, (K(J), J = 1, 16)
    END
```

FIG. 8

INVENTOR.
VICTOR W. BOLIE
BY Head & Johnson
ATTORNEYS

```
100 FORMAT  (15X,  5(F4.2, 6X))
    READ 100, (A(I),  I=1,5)

    DO 200  J = 1,5
200 B(J)  =  0.00

    DO 10  I1 =  1,5
 10 B(1)  =  B (1)  +  (A ( I1))

    DO 20  I2  = 2,5
    DO 20  I1  = 1, (I2-1)
 20 B(2)  =  B(2) + (A(I2) *A(I1))

    DO 30 I3  = 3,5
    DO 30 I2  = 2, (I3-1)
    DO 30 I1  = 1, (I2-1)
 30 B(3) = B(3) + (A(I3)*A(I2)*A(I1))

    DO 40 I4  = 4,5
    DO 40 I3  = 3, (I4-1)
    DO 40 I2  = 2, (I3-1)
    DO 40 I1  = 1, (I2-1)
 40 B(4)  =  B(4) + (A(I4)*A(I3)*A(I2)*A(I1))

    DO 50 I5  = 5,5
    DO 50 I4  = 4, (I5-1)
    DO 50 I3  = 3, (I4-1)
    DO 50 I2  = 2, (I3-1)
    DO 50 I1  = 1, (I2-1)
 50 B(5) = B(5) +(A(I5)* A(I4)* A(I3) * A(I2)* A(I1))

    PUNCH 100  (B(J), J =  1,5)

    END
```

FIG. 7

INVENTOR.
VICTOR W. BOLIE
BY
Head & Johnson
ATTORNEYS

SIGNAL VECTOR RECOGNITION SYSTEM

BACKGROUND OF THE INVENTION

1. Field Of The Invention

This invention relates generally to the subjects of artificial intelligence and pattern recognition, and particularly to the problem of electronically implementing the rapid, efficient, and automatic categorization of any stimulus pattern which can be represented in the form of a multiplicity of either simultaneous or sequentially sampled analog voltages.

2. Prior Art

Previous developments in automatic pattern recognition have been either restricted to digital computer implementations which are relatively slow and inefficient for such purposes, or limited to highly specialized hardware implementations which cannot cope with generalized stimuli. Furthermore, prior pattern recognition systems provide neither simple means for accommodating stimulus-dependent tolerances in their recognition discriminant functions, or adequate means for evaluating and displaying profiles of the "near-miss" dangers associated with any particular decision. These and other disadvantages will be seen to be absent or minimized in the various specific embodiments of the pattern recognition system of this invention.

GENERAL DISCUSSION OF OBJECTS AND PRINCIPLES

The description of the objectives and functional principles of this invention will be greatly simplified by the introduction here of a few items of terminology which can apply to any stimulus-responsive machine. Let a multiplicity of N positive analog signal voltages applied to an array of N input terminals be referred to as a *stimulus vector*. Let another multiplicity of M positive analog signal voltages exciting an array of M output terminals be referred to as a *response vector*, especially if each of its M elements is indicative of the degree of likeness between the stimulus vector and a particular vector of known identity. A given stimulus vector may be imperfect because of moderate random noise superimposed on each of its N constituent elements. Let a suitably stored and accessible N-element vector representing the statistical average of a collection of several imperfect models of a known stimulus vector be referred to as a *reference vector*. Let another suitably stored and accessible N-element vector representing the N separate root-mean-square deviations, obtained by computing or estimating for a collection of several imperfect models of a known stimulus vector the standard deviation of each vector-element about its statistical mean value, be referred to as a *tolerance vector*. It is apparent in these definitions that any reference vector and its corresponding tolerance vector can readily be generated and stored in various ways which are well known in the digital and analog computer arts.

With the aid of the foregoing general terminology, some helpful items of specific terminology may be formulated. First, let any electronic system which senses a stimulus vector and generates a meaningful response vector based on the stimulus vector and a set of stored reference and tolerance vectors be referred to as a *stimulus interpreter*. Second, let any electronic system which automatically scans or measures the successive elements of a response vector and identified either the largest element, or the first element not exceeded in magnitude by any other element, be referred to as a *response interpreter*. Third, let any electrical network devoted exclusively to the generation of one and only one element of a response vector be referred to as a *stimulus identifier*.

OBJECTS

A first object of this invention is to provide a simple procedure for converting a stimulus vector and an ordered set of paired reference and tolerance vectors into a response vector.

A second object of this invention is to provide a stimulus interpreter which functions in accord with the procedure for generating a response vector.

A third object of this invention is to provide a response interpreter which if connected to the output terminals of the stimulus interpreter forms a complete signal-vector recognition system.

A fourth object of this invention is to provide a hybrid comparator unit which is uniquely suited as one of the key components of the stimulus interpreter.

A fifth object of this invention is to provide a stimulus identifier which can function irrespective of any fluctuations in the normed length of a stimulus vector, and which is useful in automatic speech recognition.

A sixth object of this invention is to provide novel means by which a conventional digital computer can be made to select from any collection of reference vectors those particular vectors which constitute the most orthogonal subset.

Other objects and advantages of this invention will become apparent in the following description of its principles and structure, taken in conjunction with the appended drawings.

BRIEF DESCRIPTION OF THE DRAWINGS

FIGS. 6 and 7 show the genesis of a computer program which will selectively identify each and every unique combination of N different objects taken K at a time.

FIG. 8 shows a program structure which will enable a computer to repetitively select a new combination of reference vectors and punch-out their identification indices together with an accurate measure of their orthogonality.

DESCRIPTION OF THE PREFERRED EMBODIMENT

Figure 1:
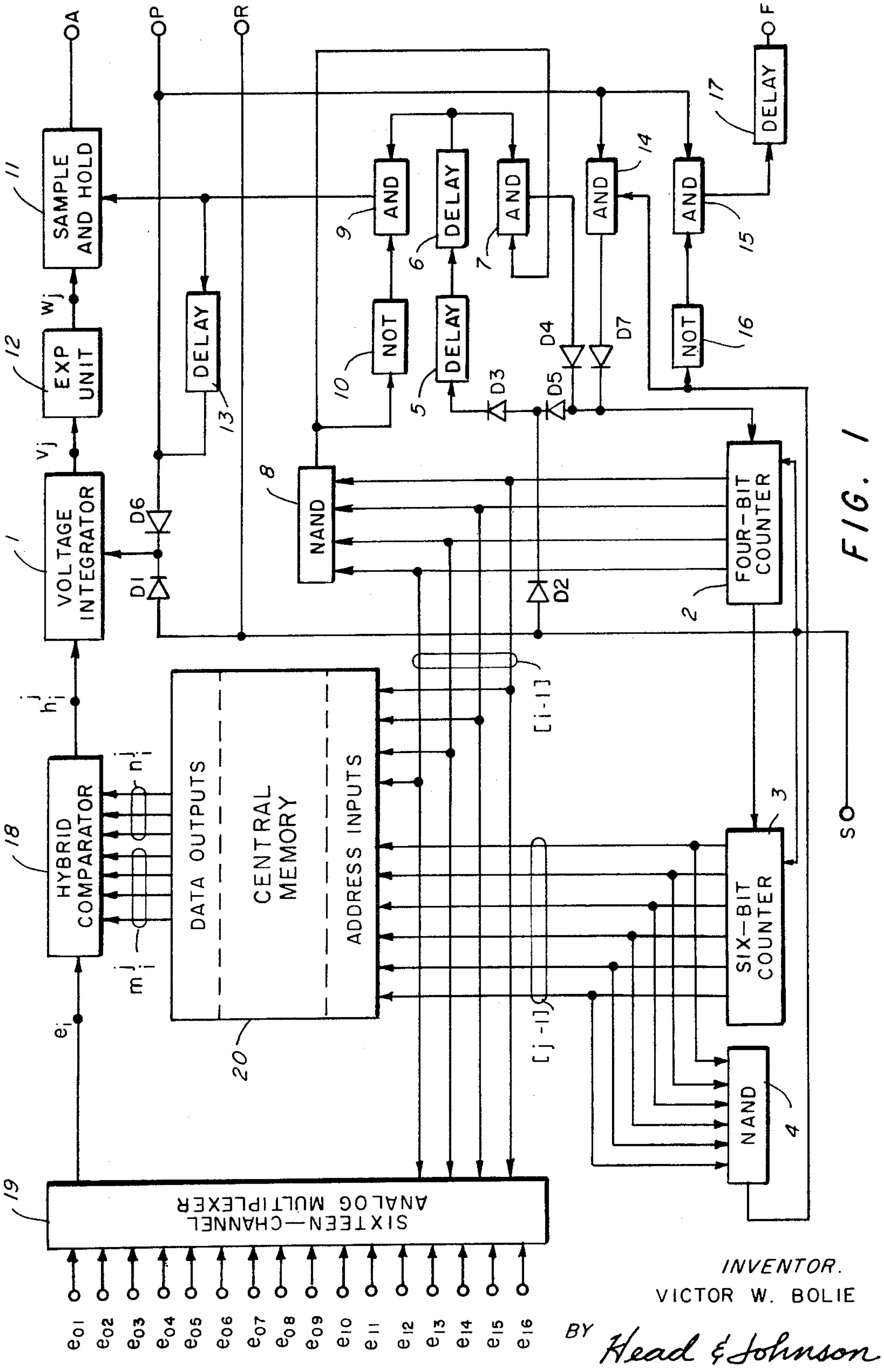
FIG. 1 shows the schematic structure of a stimulus interpreter which generates a response vector of 64 elements while scanning a 16-element stimulus vector 64 times.

Turning now to FIG. 1, which illustrates one embodiment of the stimulus interpreter portion of this invention, it is seen that there are four output terminals labelled A, P, R, and F, and that in addition to a single input terminal labelled S there are 16 parallel input terminals labelled $e_i$ wherein $i = 1, 2, \ldots, 16$. Each $e_i$ is an element of the applied stimulus vector, and is an analog voltage falling within the range of $0 \leq e_i \leq v_o$ wherein typically $v_o = 10$ volts. At the output terminal A there is produced in serial sequence for $j = 1, 2, \ldots, 64$ the successive elements $w_j$ of the response vector, which are analog voltages falling within the range of $0 \leq w_j \leq v_o$. Assumed but omitted for clarity in FIG. 1 is a common ground bus of zero-volt potential, with respect to which all voltages are measured.

For descriptive purposes, it can be assumed hereinafter that every logic-control signal-voltage such as that produced by an AND gate, and every binary-data signal-voltage such as one of the bits in a counter readout or memory readout, is either at the zero-volt level or at the positive-potential level of $v_o = 10$ volts. It can also be assumed that every pulse, such as that required to trigger a change in the state of a counter, is a positive-going rectangular pulse of 10-volt amplitude and 5-microsecond duration.

The stimulus interpreter shown in FIG. 1 is seen to be comprised of a voltage integrator 1, two binary counters, 2, 3, four pulse-delay units 5, 6, 13, 17, four AND gates 7, 9, 14, 15, two NAND units 4, 8, two NOT units 10, 16, a sample-and-hold unit 11, an exponential unit 12, a hybrid comparator 18, an analog multiplexer 19, a central memory 20, and the seven diodes D1 through D7. With the exception of the hybrid comparator 18 which will be described in detail subsequently herein, each of the above enumerated components is individually a device of well-known structure which may be obtained commerically from such firms as Analog Devices, Inc. of Cambridge, Mass., the Ferroxcube Corporation of Saugerties, N.Y., the Burr-Brown Research Corporation of Tucson, Ariz., and other commercial institutions.

As suggested in FIG. 1 by the number and arrangement of output data lines of the central memory 20, it is assumed that the $i^{th}$ element of the $j^{th}$ reference vector can be represented with sufficient accuracy by a four-bit binary number $m_i^j$, and that the corresponding $i^{th}$ element of the $j^{th}$ tolerance vector can be represented with sufficient accuracy by a three-bit binary number $n_i^j$. Thus, with a memory word-length of seven bits and a total memory capacity of $64 \times 16 = 1{,}024$ words, a given four-bit element $0 \leq m_i^j \leq 15$ of a particular reference vector may be paired within a single seven-bit word with its corresponding three-bit element $0 \leq n_i^j \leq 7$ of the associated tolerance vector. In accord with this word format it is assumed that prior to any operation of the system of FIG. 1 as a stimulus interpreter, the central memory 20 is loaded in such a way that the first reference vector and its associated tolerance vector are stored in sequential paired-element order in the first 16 memory locations, the second pair of associated reference and tolerance vectors are similarly stored in the second set of 16 memory locations, and so on, until all of the 1,024 memory locations are filled by the 64 pairs of reference and tolerance vectors.

As further shown in FIG. 1 by the number and arrangement of the input address lines of the central memory 20, the successive seven-bit data words are retrieved sequentially by means of the combined 10-bit address-stepping action of the four-bit counter 2 connected in triggering series with the six-bit counter 3. The four readout lines of counter 2 are also used as the address-control inputs of the multiplexer 19, so the index $i$ determines which of the 16 analog voltages comprising the stimulus vector is represented by the output voltage $e_i$ of the multiplexer 19. Thus, for the analog signal $e_i$ and the digital signals $m_i^j$ and $n_i^j$ used as inputs for the hybrid comparator 18, the subscript index $i$ is controlled by counter 2 and the superscript index $j$ is controlled by counter 3.

The function of the hybrid comparator 18 is to convert its input signals $e_i$, $m_i^j$, and $n_i^j$ into an analog output voltage $h_i^j$ In accord with the formula $$h_i^j = v_o \cdot \left\{1 - \text{Exp}\left(-\frac{|(e_i/v_o) - (m_i^j/15)|}{\beta + \gamma\cdot(n_i^j/7)}\right)\right\}$$

in which $\beta$ and $\gamma$ are dimensionless constants having the values of $\beta = 0.167$ and $\gamma = 1.75$ for typical sensitity, and in which the entire numerator of the exponential term may be referred to as the quotient of a discrepancy voltage $$d_i^j = |e_i - (v_o / 15) \cdot m_i^j|$$

divided by the upper-limit voltage $v_o$. In this formula it can be seen that the general intent is that the analog output voltage $h_i^j$ of the hybrid comparator 18 should be zero when the stimulus vector element $e_i$ is equal to the analog-converted reference vector element $(m_i^j/15)\cdot v_o$, or when $d_i^j = 0$, and that the output voltage $h_i^j$ should increase toward the upper-limit voltage $v_o$ monotonically and with an asymptotically decreasing slope as the absolute value $d_i^j$ of the difference between $e_i$ and $(m_i^j/15)\cdot v_o$ increases. Also evident in the formula is the further intent that the rate of change $\delta h_i^j/\delta d_i^j$ of the comparator output voltage $h_i^j$ with respect to the discrepancy voltage $d_i^j$ should, in the neighborhood of $d_i^j = 0$, be inversely related to magnitude of the analog-converted reference vector element $(n_i^j/7)\cdot v_o$ in such a way that it has a maximum value of about 6.0 when $n_i^j = 0$ and a minimum value of about 0.52 when $n_i^j = 7$.

Numerous methods can be foreseen for achieving the intended functional behavior of the hybrid comparator 18. One obvious method would be to electrically synthesize the stated formula by direct use of a pair of digital-to-analog converters, a pair of voltage summing devices, an absolute value detector, a voltage quotient unit, and an analog exponential unit. A novel and simpler method for constructing the hybrid comparator 18 will be described herein later. The present discussion may proceed with the assumption that the hybrid comparator 18 performs as prescribed and in the above equation for converting the signals $e_i$, $m_i^j$, and $n_i^j$ into the analog voltage $h_i^j$.

The function of the voltage integrator 1 is to accumulate, during a controlled time interval of fixed duration, the algebraic mean value of the sixteen successive voltages $h_i^j$ for $1 \leq i \leq 16$, for each value of $j$. Thus, the analog output voltage of the integrator 1 is given by the formula $$v_j = \frac{1}{16} \sum_{i=1}^{16} h_i^j$$

It will be seen in the subsequent discussion of the system event-timing controls that this signal averaging function desired of the integrator 1 is facilitated by the fact that immediately after the output voltage of integrator 1 is reset to zero its analog input terminal is excited by the time-sequenced collection of all the $h_i^j$ for which $1 \leq i \leq 16$ with $j$ fixed and for which every index $i$ is maintained for the same time interval.

The function of the exponential unit 12 is to produce an analog output voltage $w_j$ which is related to its analog input voltage $v_j$ by the formula $$w_j = v_o \cdot \mathrm{Exp}\,[-(16\alpha/v_o)\cdot v_j],$$

in which $\alpha$ is a dimensionless constant having the value of $\alpha = 0.25$ for typical overall sensitivity.

The function of the sample-and-hold unit 11 is to capture and retain a replica of its analog input voltage $w_j$ whenever commanded to do so by application of a pulse to its digital input terminal. The retained output voltage of the sample-and-hold unit 11 is the analog voltage produced at the output terminal A of the stimulus interpreter system.

With respect to event-timing and pulse-routing in the system of FIG. 1, it should first be noted that the system is designed so that a self-sustained and complete sequence of events required to serially produce all of the successive elements $w_j$ of the 64-element response vector at the output terminal A is initiated by applying a single pulse input to the start terminal S. In addition to its event-initiator function, this start pulse also furnishes an alert pulse at the output terminal R for use in initializing the state of any connected external equipment. At the output termnal P, a single flag pulse appears shortly after each of the response-vector elements produced at output terminal A is safely valid. Upon completion of all the events required to generate the 64 element response vector, a single end pulse appears at the output terminal F, after which no further events occur unless a new start pulse is applied to the input terminal S.

METHOD OF OPERATION OF THE STIMULUS INTERPRETER

The control of the automatic sequence of events in the functioning stimulus interpreter system of FIG. 1 may now be described in detail. A single positive pulse applied to the start terminal S not only resets-to-zero the integrator 1 through diode D1, and resets-to-zero the four-bit counter 2 and the six-bit counter 3, but also applies an initiator pulse to the first delay unit 5 through diodes D2 and D3. The first and second delay units 5 and 6, together with the first AND gate 7 and diodes D3, D4, and D5 form a regenerative loop which when once activated by a single start-pulse will continue to supply to the input terminal of the first delay unit 5 a periodic train of short-duration pulses of period $t_o$, for as long as the first AND gate 7 is maintained in the transmit condition by the output of the NAND unit 8. It is assumed that the first and second delay units 5 and 6 each respond to an input pulse by furnishing at a time lapse of $(t_o/2)$ later a reconstructed output pulse. The basic pulse-train period $t_o$ may typically have the value of $t_o = 100$ microseconds.

The output voltage of NAND unit 8 is zero if and only if counter 2 has counted exactly 15 trigger pulses entering its input terminal after being reset. Consequently, the regenerative path for the 16th pulse produced at the output terminal of the second delay unit 6 is interrupted by the deactivated AND gate 7. However, this 16th pulse is transmitted through the second AND gate 9 which, in coincidence with the deactivation of AND gate 7, is activated by the output of the NOT unit 10 being driven to its maximum positive level by the zero-going output of NAND unit 8. The output terminal of the second AND gate 9 is connected to the digital input terminal of the sample-and-hold unit 11, and to the input terminal of the third delay unit 13. Thus, by means of the pulse scheme described, the four-bit counter 2 is caused to dwell in each of its 16 successive states for a time duration $t_o$, and a total time span of $16t_o$ elapses between the moment when the start pulse is applied to the system input terminal S and the moment when the sample-and-hold unit 11 receives its pulse command to capture the output voltage $w_j$ of the exponential unit 12 and to reproduce this voltage at the system output terminal A.

The time interval elapsing between the input and output pulses of the third delay unit 13 is assumed to be no more than enough to safely span the capturing time-lag of the sample-and-hold unit 11, which may be assumed here to be of approximately 5 microseconds duration.

In the system of FIG. 1 it is seen that the output connections of the third delay unit 13 are such that the output pulse produced by the third delay unit 13 serves both to reset integrator 1 through diode D6 and to furnish the flag pulse at the system output terminal P. It is also seen that the signal input terminals of the third and fourth AND gates 14 and 15 are both connected to the output terminal of the third delay unit 13. The controlling input terminal of AND gate 15 is connected to the output terminal of the second NOT unit 16. The controlling input terminal of AND gate 14 and the input terminal of the complementary NOT unit 16 are both connected to the output terminal of the second NAND unit 4. By means of these interconnections the third AND gate 14 is maintained in the transmitting condition and the fourth AND gate 15 is maintained in the blocking condition, for as long as the output of NAND unit 4 remains in the non-zero state. Conversely, as soon as a total of $63 \times 16 = 1{,}008$ pulses have been transmitted to the input of counter 2, and counter 2 has responded by progressively transmitting 63 pulses to the input of counter 3, the output of the six-input NAND unit 4 connected to the six readout terminals of counter 3 will drop to the zero-voltage level, thereby bringing the third AND gate 14 into the blocking condition and bringing the fourth AND gate 15 into the transmitting condition. Therefore, the first output pulse produced by delay unit 13 will be transmitted through AND gate 14 and diode D7, to advance counter 2 into its forthcoming zero state, and to initiate a second self-sustained pulse train through diode D5.

The transition of counter 2 into its new zero state will cause counter 3 to be advanced by one step, so the new value of the index $j$ will remain fixed at $j = 2$ for the duration of the second pulse train. After completion of this second self-sustained train of 16 pulses, the state of counter 3 will be advanced by one more step, so the value of the index $j$ will remain fixed at $j=3$ for the duration of the third pulse train. This process will continue onward through the case in which the state of counter 3 has accumulated a total count of 63, with the value of the index $j$ being held fixed at $j=64$ while the regenerative pulse loop advances the index $i$ through the full pulse-train range of $1 \leq i \leq 16$. Just as for each pulse train generated with a smaller value of the index $j$, the 16th pulse of the $j = 64$ train escapes through AND gate 9 to activate the sample-and-hold unit 11 and to trigger the input of delay unit 13. However, at the end of the $j=64$ train the output pulse from delay unit 13 which resets integrator 1 and supplies the flag pulse at output terminal P does not survive passage through the deactivated AND gate 14. Instead, it is transmitted through the activated AND gate 15 to the input terminal of the fourth delay unit 17, which after a predetermined time interval of typically 50 microseconds produces a single pulse at the system output terminal P to signal the end of all operations.

Thus, as a result of the above described sequence of operations, it is seen that the stimulus interpreter system of FIG. 1 senses the stimulus vector comprised of the 16 ($1 \leq i \leq 16$) parallel analog voltages $e_i$, and produces in serially sequenced form at the output terminal A the 64 ($1 \leq j \leq 64$) analog voltages $w_j$ comprising the response vector. A single start pulse applied to the input terminal S results in the production of one response vector, the completion of which is signalled by the appearance of an end pulse at the output terminal F. For use with any connected external equipment, an alert pulse appears at the output terminal R in coincidence with the start pulse applied to the input terminal S, and each element $w_j$ of the response vector is accompanied by the appearance of a flag pulse at the output terminal P to mark the beginning of the time interval over which the output $w_j$ is valid. During the production of every response vector, the central memory is fully searched to retrieve each successive element $0 \leq m_i^j \leq 15$ of each of the 64 numerically stored reference vectors, and each successive element $0 \leq n_i^j \leq 7$ of the 64 numerically stored tolerance vectors. The response vector is related to the stimulus vector, and to the collection of stored reference and tolerance vectors, by the system equation $$w_j=v_o\cdot\text{Exp}\left[-\alpha\cdot\sum_{i=1}^{16}\left\{1-\text{Exp}\left(-\frac{|(e/v_o)-(m_i^j/15)|}{\beta+\gamma\cdot(n_i^j/7)}\right)\right\}\right]$$

in which $\alpha = 0.25$, $\beta = 0.167$, and $\gamma = 1.75$, and in which $v_o = 10$ volts. By inspection of this equation for the overall performance of the stimulus interpreter it is seen that each particular element of the response vector is a measure of the degree of likeness between the stimulus vector and a particular one of the many reference vectors stored in the central memory, and that the sensitivity of this measure is controlled by the stored tolerance vector associated with that particular reference vector. It is, of course, apparent that by use of conventional electronic techniques the system of FIG. 1 may readily be modified to accommodate fewer or more pairs of reference and tolerance vectors, or to accommodate a stimulus vector of fewer or more elements.

Figure 2:
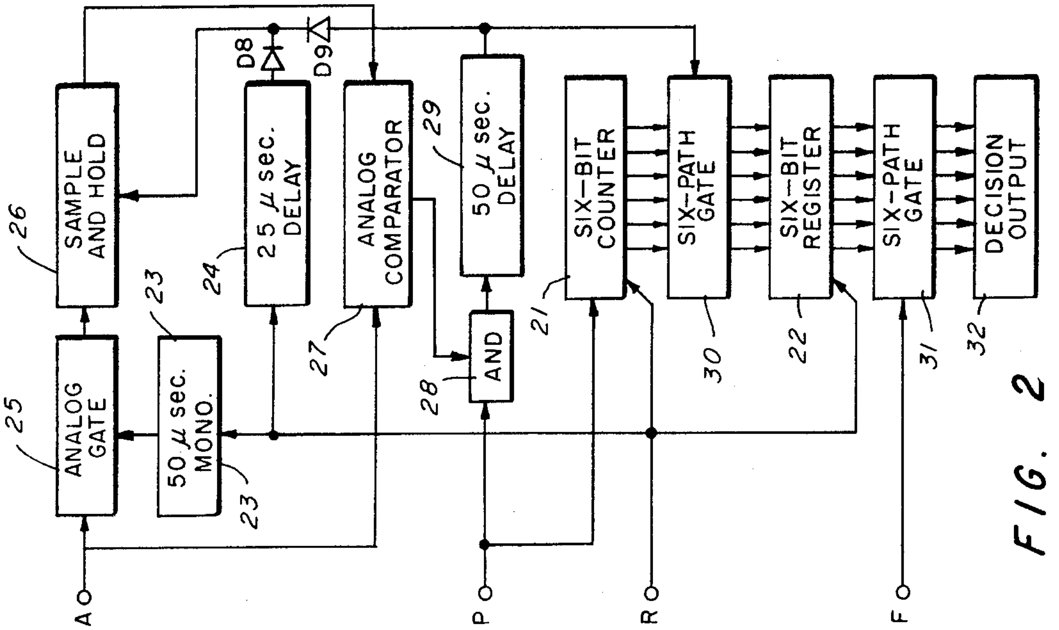
FIG. 2 shows the schematic structure of a response interpreter designed to interconnect with the stimulus interpreter of FIG. 1 and thereby form a complete signal-vector recognition system.

Turning next to FIG. 2, which shows the structures of a response interpreter suitable for use with the stimulus interpreter system of FIG. 1, it is seen that there are four input terminals, which are labelled A, P, R, and F in correspondence with the labelling of the output terminals of the stimulus interpreter. Assumed, but omitted for clarity, is a common ground bus of zero-volt potential, with respect to which all voltages in the system are measured. As in the previous discussion of FIG. 1, it will also be assumed that all the voltages are positive, that every analog signal and every logic or data signal has an upper limit of 10 volts, and that every pulse has a rectangular waveform which rises from the zero-volt level to the maximum 10-volt level where it remains for a time interval of 5 microseconds before falling back to the zero-volt level.

The response interpreter system of FIG. 2 is seen to be comprised of a six-bit counter 21, a six-bit binary data register 22, a 50-microsecond monostable multivibrator 23, a 25-microsecond delay unit 24, an analog signal gate 25, a sample-and-hold unit 26, an analog voltage comparator 27, an AND gate 28, a 50-microsecond delay unit 29, a first six-path data gate 30, a second six-path data gate 31, a decision-output display device 32, and the diodes D8 and D9. For the purposes of this discussion it will be assumed that the decision-output display device 32 is is a simple panel of six binary indicator lamps of the type commonly used to make visible the electrical state of a binary data register. Each of the above, enumerated components of FIG. 2 is thus individually a device of well-known structure which need not be detailed herein.

It will be recalled from the above description of FIG. 1 that the signals produced at the output terminals R, A, P, and F of the stimulus interpreter and made available to the input terminals R, A, P, and F of the response interpreter are, respectively, an alert-pulse at R to denote the beginning of a response vector, a first analog voltage at A representing the first element of the response vector, a first flag-pulse at P to denote the earliest validity of the first A signal, a second analog voltage at A representing the second element of the response vector, a second flag-pulse at P to denote the earliest validity of the second A signal, and so on, until all 64 elements of the response vector have been presented at A and validated at P, after which an end-pulse appears at F to denote the completion of the response vector.

In the response interpreter system of FIG. 2 the interconnections between the various components are seen to be such that the incoming alert-pulse at R will reset-to-zero the six-bit binary counter 21 and the six-bit data register 22, and simultaneously trigger the inputs of the monostable multivibrator 23 and the 25 microsecond delay unit 24. The analog signal gate 25 interposed between the system input terminal A and the input terminal of the sample-and-hold unit 26 is arranged to be controlled by the monostable multivibrator 23 in such a way that the input terminal of the sample-and-hold unit 26 is functionally disconnected from the system input terminal A and connected to the zero-volt ground bus only during the 50-microsecond time interval immediately following the application of a triggering pulse to the input terminal of the monostable multivibrator 23. The output terminal of the 25-microsecond delay unit 24 is connected through diode D8 to the digital input terminal of the sample-and-hold unit 26. In this way the analog output voltage of the sample-and-hold unit 26 is initialized to the zero-volt potential level shortly after the alert pulse is received at the system input terminal R.

In the response interpreter system of FIG. 2 it is seen that one of the two input terminals of the analog comparator 27 is connected to the system input terminal A and the other is connected to the output terminal of the sample-and-hold unit 26. The output terminal of the analog comparator 27 is connected to the controlling input terminal of the AND gate 28 in such a way that AND gate 28 is switched into the transmitting condition if and only if the analog voltage present at the system input terminal A is greater than the analog voltage present at the output terminal of the sample-and-hold unit 26, as measured by the analog comparator 27. It is further seen in FIG. 2 that the system input terminal P is connected to the signal input terminal of AND gate 28, and to the triggering input terminal of the six-bit counter 21. The output terminal of AND gate 28 is connected to the input terminal of the 50-microsecond delay unit 29. The output terminal of delay unit 29 is connected through diode D9 to the digital input terminal of the sample-and-hold unit 26, and to the enabling input terminal of the six-path gate 30. In this way, the state of the counter 21 will be advanced by one step each time a flag-pulse appears at the system input terminal P, but delay unit 29 will not produce an output pulse to trigger the sample-and-hold unit 26 and the six-path gate 30 unless the corresponding analog voltage present at the system input terminal A is of greater magnitude than the analog voltage retained at the output terminal of sample-and-hold unit 26. Thus, the six-bit counter 21 maintains a running count of the number of response-vector elements presented in succession at the system input terminal A, and the sample-and-hold unit 26 retains the largest one of these elements. Through the action of the six-path gate 30, the state of the six-bit counter 21 is replicated in the six-bit binary-data register 22, each time a larger response-vector element is sensed by the analog comparator 27 and captured by the sample-and-hold unit 26. Consequently, the six-bit binary number stored in the data register 22 is the identification of the largest of the response-vector elements which have been presented at the system input terminal A subsequent to the alert-pulse originally presented at the system input terminal R. It is assumed that there exists in the analog comparator 27 a 0.1-volt zone of inaction which will not permit the AND gate 28 to be activated unless the analog voltage present at the system input terminal A actually exceeds by 0.1 volt the analog voltage present at the output terminal of the sample-and-hold unit 26. In the special case in which there are several equally large elements which are not exceeded in magnitude by other elements of the response vector, only the first of the largest elements will be identified in the six-bit data register 22.

When all of the elements of the response vector have been presented at the system input terminal A, each verified by a flag-pulse presented to the input system terminal P, there remains in the binary-data register 22 the identification of the largest response-vector element. The final appearance of the end-pulse at the system input terminal F causes the second six-path gate 31 to transfer the identification of the largest element, or the first of several largest elements, of the response vector from the data register 22 to the decision-output display device 32. consequently, when the input terminals A, P, R, and F of the response interpreter system of FIG. 2 are connected respectively to the output terminals, A, P, R, and F of the stimulus interpreter system of FIG. 1, the resulting composite system is seen to have the capability for automatically categorizing an input stimulus pattern by making visible in an array of output display lamps the identifying number of the particular one of a stored set of unalike reference vectors which most closely matches the stimulus vector. A highly advantageous feature of the composite system is that variable tolerances in the many reference-vector elements are easily accommodated in the categorization process.

Figure 3:
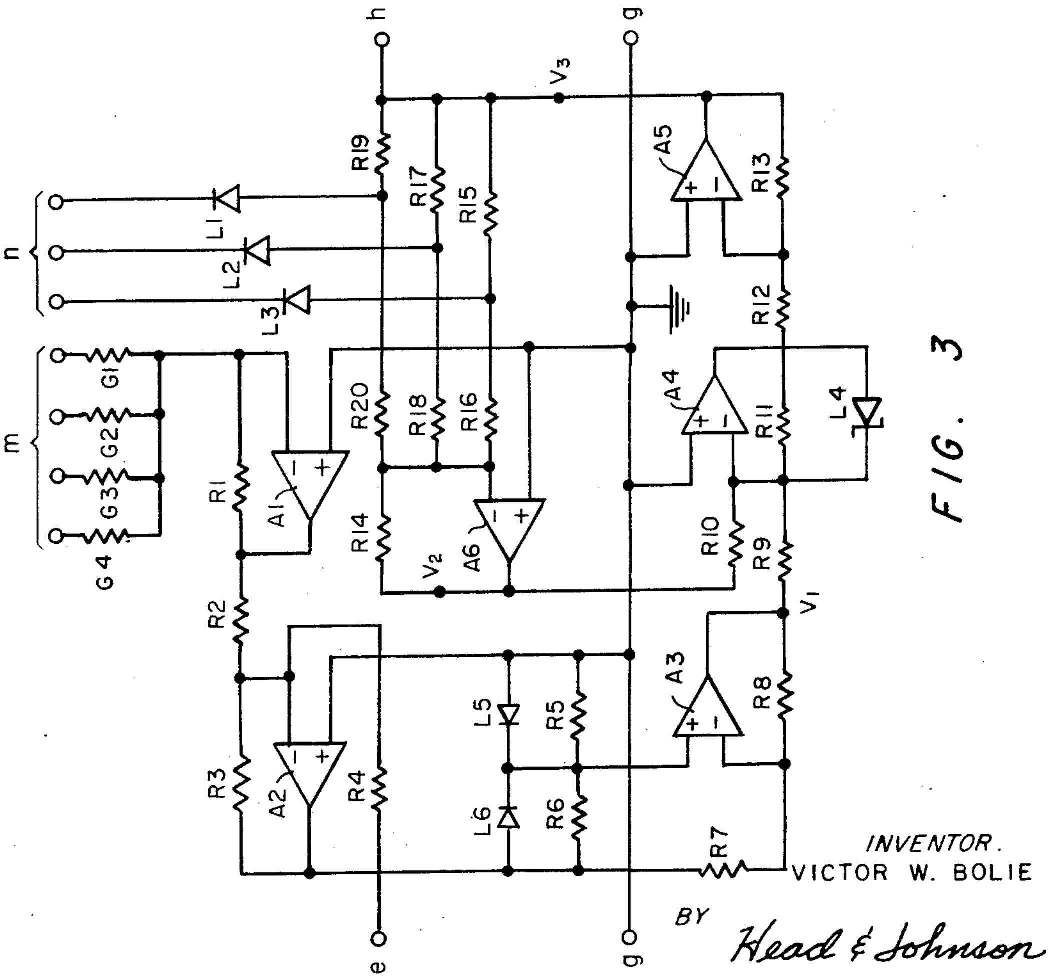
FIG. 3 shows the circuit design of a hybrid comparator unit which is uniquely suited to serve as a component of the stimulus interpreter illustrated in FIG. 1.

Turning next to the electrical circuit diagram of FIG. 3, which shows a hybrid comparator unit of novel structure suitable for use in the stimulus interpreter system of FIG. 1, it is seen that in addition to the terminals of the common ground bus *g* there is a terminal for an analog output voltage h and a terminal for an analog input voltage *e*. For the purposes of this discussion it will be assumed that $0 \leq e \leq v_o$ and $0 \leq h \leq v_o$, wherein $v_o$ has the typical positive value of $v_o = 10$ volts. In the circuit of FIG. 3 a set of four input terminals is provided for sensing a four-bit reference number $0 \leq m \leq 15$ represented in electrical binary form, and another set of three input terminals is provided for sensing a three-bit tolerance number $0 \leq n \leq 7$ similarly represented in electrical binary form. Each of the seven voltages representing the reference and tolerance numbers *m* and *n* is assumed to be a potential which is maintained either at the zero-volt level or at the positive voltage level $v_o$ by the action of an external device such as a seven-bit binary data register.

It is further seen that the hybrid comparator unit shown in FIG. 3 is comprised of six operational amplifiers A1, A2, A3, A4, A5, A6, one Zener diode L4, five ordinary diodes L1, L2, L3, L5, L6, four conductances G1, G2, G3, G4, and the 20 resistances R1 through R20. With the assumption that the 10-volt potential level $v_o$ is the upper-limit voltage for both the analog and digitial signals, a set of compatible values for the four conductances G1 through G4, and the 20 resistances R1 through R20 is listed in the following table.

| Component | Value |
|---|---|
| Zener diode L4 | 10-volt breakdown |
| G1, G2, G3, G4 | 10, 20, 40, 80 micromhos |
| R1 and R14 | 6667 and 11,430 ohms |
| R2, R3, R4, R5 | Each 10 kilohms |
| R6, R7, R8 | Each 20 kilohms |
| R9, R10, R11 | 25, 14.3, 150 kilohms |
| R12 and R13 | Each 10 kilohms |
| T15 and R16 | Each 10 kilohms |
| R17 and R18 | Each 20 kilohms |
| R19 and R20 | Each 40 kilohms |

It will be seen in the subsequent description that these component values will produce the desired scale factors in the signal-transfer characteristics of the hybrid comparator.

When interconnected as shown in FIG. 3, the amplifier A1, the resistance R1, and the four conductances G1 through G4 operate as a four-bit digital-to-analog converter having a negative output voltage. Thus, the output voltage of amplifier A1 is equal to $[-(m/15)\cdot v_o]$. The amplifier A2 and the resistances R2, R3, and R4 operate as a two-input voltage-summing device having a negative output voltage and a gain of unity. Hence, the output voltage of amplifier A2 is equal to $[(m/15)\cdot v_o - e]$. The subcircuit comprised of the amplifier A3, the diodes L5 and L6, and the resistances R5, R6, R7, and R8 is that of a full-wave rectifier having a gain of unity, a positive output voltage, and a symmmetrical driving impedance. Consequently the output voltage $v_1$ of amplifier A3 is given by the formula $v_1 = |e - (m/15)v_o|$.

It is further, seen in FIG. 3 that the subcircuit comprised of the amplifier A4, with its connected voltage-limiting Zener diode L4, and the resistances R9, R10, and R11 forms a two-input voltage-summing device having a negative output voltage which is limited in magnitude to no more than 10 volts, and having a gain of 6.0 for the applied voltage $v_1$ and a gain of 10.5 for the applied voltage $v_2$. The amplifier A5 and its connected resistances R12 and R13 serves only to reverse the algebraic sign of the output voltage of amplifier A4. The output voltage $v_3$ of amplifier A5 is therefore given by the formula $$2v_3=(v_o+6v_1+10.5v_2)-|v_o-6v_1-10.5v_2|,$$

in which $v_o = 10$ volts. The subcircuit comprised of the amplifier A6, the seven resistances R14 through R20, and the three diodes L1, L2, and L3 constitutes a sign-reversing hybrid multiplier which multiplies the analog voltage $v_3$ by the ratio $(-n/7)$. Thus, the output voltage $v_2$ of amplifier A6 is given by the formula $v_2 = -(n/7)\cdot v_3$. The substitution of this expression into the previous formula for $v_3$ gives $$2v_3=\left(v_0+\frac{6v_1}{1+(3n/2)}\right)-\left|v_0-\frac{6v_1}{1+(3n/2)}\right|$$

as the equation for $v_3$ in terms of $v_1$.

It can be seen in FIG. 3 that the output voltage $h$ of the hybrid comparator circuit is given by the simple relation $h = v_3$. The substitution of this relation, and the previously derived relation $v_1 = |e - (m/15)\cdot v_o|$, into the above expression for $v_3$ gives the formula $$h=\left(\frac{v_0}{2}+3\ \frac{|e-(mv_0/15)|}{1+(3n/2)}\right)-\left|\frac{v_0}{2}-3\ \frac{|e-(mv_0/15)|}{1+(3n/2)}\right|$$

as the performance equation for the hybrid comparator.

Figure 4:
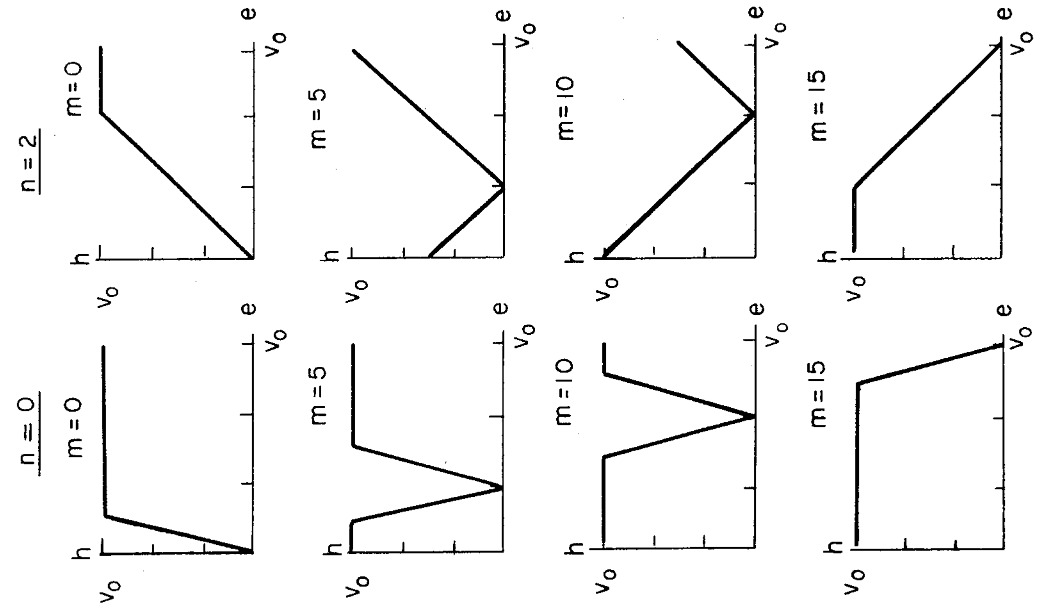
FIG. 4 shows in graphical form the input-output characteristics of the hybrid comparator circuit of FIG. 3, plotted for several different settings of its reference and tolerance numbers.

The overall performance of the hybrid comparator circuit of FIG. 3 is graphically illustrated in FIG. 4, which shows plots of $h$ versus $e$ for the reference numbers $m = 0$, $m = 5$, $m = 10$, and $m = 15$ in the two situations governed by the tolerance numbers $n = 0$ and $n = 2$. The significant features shown by these curves are that the analog output voltage $h$ is zero if and only if the analog input voltage $e$ is in close agreement with the reference voltage $(m/15)\cdot v_o$, and that the sensitivity of this measure of agreement is inversely related to tbe tolerance number $n$. Finally, a careful examination of the above developed performance equation for the hybrid comparator circuit of FIG. 3 will show that it is a reasonably good approximation of the more-easily-written formula $$h=v_0\cdot\left[1-\text{Exp}\left(-\frac{|(e/v_0)-(m/15)|}{\beta+\gamma\cdot(n/7)}\right)\right]$$

in which $\beta = 0.167$ and $\gamma = 1.75$, and in which $v_o = 10$ volts. Thus, it is seen that the subsystem illustrated in FIG. 3 will uniquely perform the functions required of the hybrid comparator 18 of FIG. 1.

When the output terminals of the stimulus interpreter system of FIG. 1 are connected to the input terminals of the response interpreter system of FIG. 2, the resulting composite unit is a signal vector recognition system having numerous unique and advantageous features. Its discriminant function is a simple algorithm which is implemented by a high-speed hybrid electronic circuit of novel design. Its use of a separate tolerance vector associated with each different reference vector allows each individual element of each reference vector to have its own separate degree of emphasis in the automated decision process. Its use of a simple core memory for storage of the reference and tolerance vectors allows the composite unit to be easily and rapidly adapted to new applications. In fact, the compositie unit can readily be converted into an adaptive learning machine by use of a small auxiliary computer to continually update the reference and tolerance vectors in accord with the stimulus-vector history. For example, each updated reference vector can be made equal to eighty percent of its prior configuration, plus 20 percent of a new (and possibly imperfect) configuration represented as an input vector of known identity. Thereafter, each corresponding tolerance vector can be updated by making it equal to 90 percent of its prior configuration, plus 10 percent of a special vector whose elements are non-negative and equal to the absolute values of the respective elements of the vector difference between the formerly associated reference vector and its corresponding new input vector.

In general, the composite unit resulting from the interconnection of the specifically illustrated systems of FIGS. 1 and 2 has the capability of detecting the presence or absence of any one of 64 different stimulus vectors. In certain applications it may be necessary to detect the presence or absence of only one particular stimulus vector. For such applications the above described principles can be embodied in a more economical design in the form of a stimulus identifier, which may include a provision for cancelling the effects of spurious fluctuations in the scale factor of the input stimulus vector.

Figure 5:
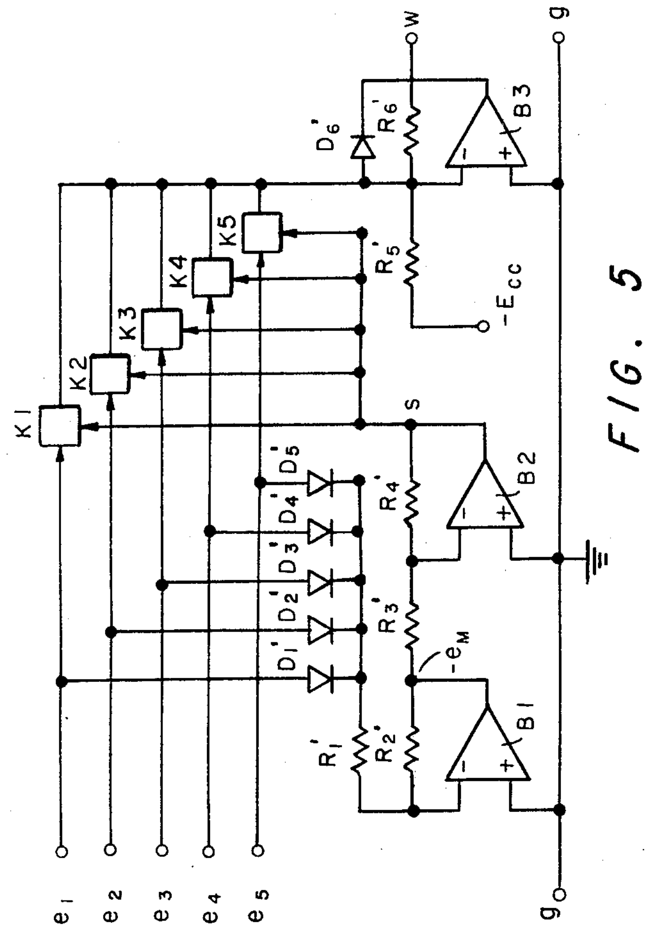
FIG. 5 shows the design of a stimulus identifier which will uniquely identify any prescribed five-element stimulus vector, irrespective of its normed length or scale factor.

Turning next to FIG. 5, which shows the structure of an amplitude-invariant stimulus identifier, it is seen that, aside from the terminals of the common ground bus $g$, there is provided a set of five input terminals to sense the five analog voltages $e_1$, $e_2$, $e_3$, $e_4$, and $e_5$ of a five-element stimulus vector, and a single output terminal to deliver the single analog output voltage $w$. Each of the input voltages $e_i$, as well as the output voltage $w$, is assumed to be non-negative and not greater than the upper limit of $v_o = 10$ volts. The network shown in FIG. 5 is energized by a power supply of voltage $E_{cc} = \pm 15$ volts. The network is comprised of three operational amplifiers B1, B2, and B3, the six diodes $D_1'$ through $D_6'$, the six resistances $R_1'$ through $R_6'$, and the five subassemblies K1 through K5 each having the structure shown in FIG. 5A.

A set of values for the six resistances $R_1'$ through $R_6'$ which are compatible with the structure and function of the stimulus identifier illustrated in FIG. 5 may be listed as follows.

| Component | Value |
|---|---|
| $R_1'$ and $R_2'$ | Each 47 kilohms |
| $R_3'$ and $R_4'$ | 44 and 22 kilohms |
| $R_5'$ and $R_6'$ | 45 and 30 kilohms |

Figure 5A:
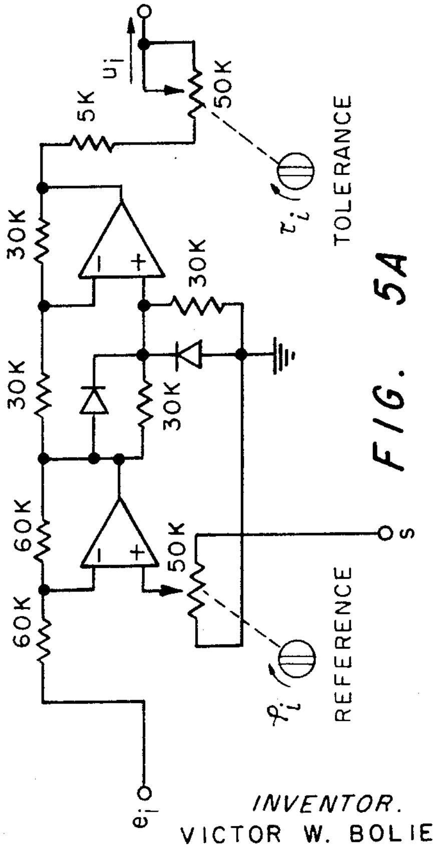
FIG. 5A shows the details of a portion of FIG. 5.

As shown in FIG. 5A, there is provided in each of the subassemblies K1 through K5 a pair of 50-kilohm linear potentiometers, one of which may have its tap position set to adjust its tapped voltage in linear coorespondence with a dimensionless reference fraction $0 \leq \rho_i \leq 1$, and the other of which may have its tap position set to adjust the tap-to-end resistance in linear correspondence with a dimensionless tolerance fraction $0 \leq \tau_i \leq 1$. Also included in the subassembly is a five-kilohm resistor which safely limits the output current $u_i$ when $\tau_i = 0$, plus a voltage-difference unit comprised of an operational amplifier and two 60-kilohm resistors, plus an absolute value unit comprised of another operational amplifier, two diodes, and four 30-kilohm resistors. Each subassembly senses the two analog input voltages $e_i$ and $s$, where $e_i$ is a particular one of the stimulus vector elements and where $s$ is a common analog voltage applied to all five subassemblies. The interconnections of the subassembly components are seen to be such that the output current $u_i$ of the $i^{th}$ subassembly is related to its input voltages $e_i$ and $s$, and to the fractional settings $\rho_i$ and $\tau_i$ of its reference and tolerance potentiometers, by the formula $$u_i = [\,|2\rho_i s - e_i|\,]/[(0.1 + \tau_i)\,r]$$

in which $r = 50$ kilohms, and in which it is assumed that the current $u_i$ flows into a zero-impedance load.

In the circuit of FIG. 5 each of the five analog voltages $e_i$ comprising the stimulus vector is assumed to reside within the range of $0 \leq e_i \leq v_o$, wherein $v_o = 10$ volts. Let $e_M$ represent the largest of the stimulus vector elements, or the voltage level attained by at least one of the elements and not exceeded by any other element. The sign-reversing unity-gain amplifier comprised by the operational amplifier B1 and its associated pair of equal resistances $R_1'$ and $R_2'$ is arranged to produce a negative output voltage equal to $(-e_M)$, which is accomplished by connecting the driving-voltage end of the resistance $R_1'$ to the cathode of each of the five diodes $D_i'$ through $D_5'$, and by connecting the anode of each successive diode $D_i'$ to the corresponding $e_i$ input terminal. The operational amplifier B2 with its associated pair of resistances $R_3'$ and $R_4'$ is arranged to attenuate by 50 percent, and to reverse the polarity of, the output voltage of amplifier B1. The output voltage s of amplifier B2 is therefore given by the formula $s = 0.5\, e_M$.

It is further seen in FIG. 5 that the five output terminals of the five subassemblies K1 through K5 are all connected in parallel to the negative input terminal of the operational amplifier B3, which behaves as a zero-impedance load because it has its positive input terminal grounded. Also connected to the negative input terminal of amplifier B3 is the resistance $R_5'$ of 45 kilohms leading to the negative power-supply voltage $(-E_{cc})$ which is assumed to be maintained at a constant level of $-E_{cc} = -15$ volts. Connected between the negative input terminal and the output terminal of amplifier B3 is a parallel combination of the 30-kilohm resistance $R_6'$ and the diode $D_6'$, which is oriented to prevent the output voltage of amplifier B3 from becoming significantly negative. Consequently, when the combined sum of the output currents of the five subassemblies is zero the output voltage $w$ of amplifier B3 is at its maximum level of $v_o = 10$ volts. As the combined sum of the subassembly output currents increases the output voltage $w$ decreases sharply toward the zero-volt level, where it remains for further increases in the subassembly output currents. The mathematical equation describing the output voltage $w$, in terms of the combined sum of the subassembly currents, is thus found to be $$2w = \left(v_0 - R_6' \cdot \sum_{i=1}^{5} u_i\right) + \left|v_0 - R_6' \cdot \sum_{i=1}^{5} u_i\right|$$

which is reasonably well approximated by the more-easily-written formuls $$w = v_0 \cdot \mathrm{Exp}\left(-\sum_{i=1}^{5} \frac{R_6' \cdot u_i}{v_0}\right)$$

Substitution of the previously developed equation for $u_i$, and use of the relation $s = 0.5\, e_M$, into the last of the above formulas gives $$w = v_0 \cdot \mathrm{Exp}\left(-6 \cdot \sum_{i=1}^{5} \frac{|(e_i/v_0) - (\rho_i e_M/v_0)|}{1 + (10 \cdot \tau_i)}\right)$$

as the equation describing the performance of the amplitude-invariant stimulus identifier illustrated in FIG. 5.

Inspection of the last equation above shows that the output voltage $w$ of the stimulus identifier illustrated in FIG. 5 is characterized by several unique properties. One of these properties is that the reference and tolerance factors $\rho_i$ and $\tau_i$ are stored in analog form, by means of separate potentiometer settings. A second property is that once the various reference potentiometer settings $\tau_i$ are adjusted to maximize the output voltage $w$ for a particular stimulus-vector input, the output voltage $w$ is thereafter unaffected by any fluctuations in the amplitudes of the stimulus-vector elements which occur coherently or in unison. A third property is that the circuit of FIG. 5 produces in an instantaneous parallel manner an output voltage $w$ which is analogous to one of the numerous serially-generated response-vector elements $w_j$ produced by the stimulus interpreter system of FIG. 1. It is, of course, obvious that the scheme shown in FIG. 5 for cancelling the effects of coherent fluctuations of the stimulus-vector elements can be applied to the stimulus interpreter system of FIG. 1, by using a scaling voltage analogous to that identified as s in FIG. 5 to uniformly modulate the amplitudes of the electrically represented reference numbers $m_i^j$ supplied to the hybrid comparator 18 in FIG. 1. Finally, it will be seen that even though the stimulus-identifier system of FIG. 5 and the stimulus-interpreter system of FIG. 1 each show the input terminals as a one-dimensional array suitable for connection to the output terminals of a device such as a speech filter bank, the input terminals may easily be rearranged into a two-dimensional grid suitable for connection to an array of photovoltaic devices.

Returning briefly to the stimulus interpreter system of FIG. 1, it will be recalled that the 64 successive pairs of reference and tolerance vectors stored in the central memory 20 are retrieved sequentially during the process of generating an output response vector. In certain applications it may be desirable to store the successive vector pairs in a particular order in the memory, i.e., in descending order of importance as predetermined by the user. Further, although it is clearly not mandatory, it may be desirable in some applications to load the 64 successive pairs of reference and tolerance vectors into the memory in such a way that the first sixteen reference vectors constitute the most orthogonal subset which can be gathered from the original collection of 64 reference vectors, and that the second group of 16 reference vectors constitute the most orthogonal subset which can be gathered from the remaining collection of 48 reference vectors, and so on, until the memory is fully loaded. If this could be done, then the first 16 elements of the output response vector would be characterized by the least possible redundancy, since in the ideal case of a completely orthogonal subset there is no correlation between any two vectors in the subset.

The problem of selecting the most orthogonal subset of a collection of vectors is a crucial point in artificial intelligence, but heretofore has not been satisfactorily reduced to a simple algorithm which can be routinely processed by a standard digital computer. A matrix-ranking procedure will identify only the largest non-zero determinant of a row of column-vectors or its equivalent column of row-vectors. The Gram-Schmidt orthogonalization procedure will convert an original set of non-orthogonal vectors into an equivalent set of orthogonal vectors, but is non-selective with respect to the degree of orthogonality of the original set. Factor analysis techniques are restricted to the specific objective of diagonalizing a statistical covariance matrix, and are far from being directly applicable to the collection of reference vectors used in the stimulus interpreter portion of the present invention.

The problem of extracting the most orthogonal subset of the complete collection of reference vectors can be solved by means of a novel mathematical technique which will now be described. The technique consists of four fundamental operations, the second and third of which are repeated alternately until completion. The first operation consists of normalizing each reference vector to unit length by dividing each of its N elements by the square root of the sum of the squares of all its elements. The second operation consists of selecting once and only once a particular and singularly unique combination of N different N-element vectors out of the large collection of normalized vectors generated by the first operation. The third operation consists of the numerical evaluation of the absolute value of the determinant of the unique N-by-N matrix generated by the second operation, and the retention of both the evaluated numerical result and the particular set of N index numbers which identify each of the particular normalized reference vectors used in the unique N-by-N matrix. The second and third operations are repeated until all possible N-by-N combinations of the many normalized N-element reference vectors are processed. The fourth operation consists of ranking the numerical results of the repeated third operation, in descending order of absolute determinant-value, each accompanied by its identifying set of index numbers. The absolute determinant-value associated with each identifying set of N index numbers is an accurate measure of the degree of orthogonality of the particular set of N vectors identified by the index numbers. Thus, if the absolute determinant-value is equal to its maximum value of unity then the N normalized vectors comprising its parent N-by-N matrix are mutually orthogonal and therefore linearly independent. At the other extreme, if the absolute determinant-value is equal to zero then its parent matrix is singular and at least one of the vectors comprising the parent matrix is merely a weighted sum of the others.

The first, third, and fourth of the above described operations are each seen to be achievable by means of conventional digital computer techniques. Realization of the second operation, however, requires the use of a computer program which has been heretofore unavailable. The description of this program may be initiated with the aid of FIG. 6, which shows by example an algorithm for generating the sequence of coefficients $b_j$ of a polynomial when the weighting coefficients $a_j$ of its equivalent factored form are known. It is seen that a given coefficient $b_k$ is equal to a $k$-tuple summation of the various unique $k$-tuple products of the weighting coefficients $a_i$. The lower limit of the pertinent summation index is unity for the first (interior) summation, two for the second, three for the third, and so on, up to $k$ for the $k^{th}$ (exterior) summation. Except for the index of the final (exterior) summation which has an upper limit equal to the degree of the polynomial, the upper limit for each particular summation index is one less than the current-value of the running index in the next-exterior summation.

The correctness of the algorithm illustrated in FIG. 6 can be verified by temporarily assuming that every weighting coefficient $a_i$ is equal to unity, in which case it will be found that the coefficient $b_k$ of the $n$-degree polynomial is equal to the number $C_k^n = (n!)/[(k!)(n-k)!]$ of distinct combinations which can be formed by selecting $k$ objects out of a total $n$ different objects.

A Fortran-language computer program which operates in accord with the algorithm illustrated in FIG. 6 is shown in FIG. 7. The first coefficient $b_1 = B(1)$ is evaluated via five cycles of a single "DO loop" whose index I1 increases stepwise through the range $1 \leq I1 \leq 5$. The second coefficient $b_2 = B(2)$ is evaluated via a "loop within a loop", with indices I1 and I2 corresponding to the indices $i$ and $j$ in the formula for $b_2$ in FIG. 6. Similar relationships apply for the remaining coefficients $b_3 = B(3)$, $b_4 = B(4)$, and $b_5 = B(5)$. The essential feature of the algorithm shown in FIG. 6 and its corresponding computer program illustrated in FIG. 7 is not in the computability of the polynomial coefficients, but rather in the automatic generation of a sequence of unique index-sets by each "nest of DO loops". It will be seen that in general these index-sets are precisely those needed in selecting the successive unique combinations required in the above-mentioned second-operation.

FIG. 8 shows a Fortran-language program which will endow a conventional digital computer with the novel capability of continually pursuing the long-range task of finding the most orthogonal 16-vector subset contained in a collection of 64 vectors of 16 elements each. The first two program statements define the input and output data formats for card reading and punching. The next six program statements control the read-in of the 64 vectors, and the normalization of each to unit length. The remainder of the program is a nest of 16 DO loops, the states of which are determined by the respective indices K(1), K (2), . . . , K (16). The last six program statements (prior to the END statement) are the actual operations performed by the DO loop nest, i.e., they control the evaluation of the absolute value Q of the determinant of the matrix of those normalized vectors selected by the DO loop indices K(J), and the subsequent punch-out of the absolute determinant-value Q and its identifying index set K(J).

The computer program of FIG. 8 was referred to above as a long-range computer task because the number $C_{16}^{64}$ of cycles required for exhaustive completion of the DO loop nest is very large. However, it will be seen that each absolute determinant-value Q is punched-out with its identifying indices K(J) as soon as it is computed, which means that the computing process can be stopped arbitrarily at any time without losing the benefits of the calculations performed up to that time. The interim collection of Q-values thus obtained can be easily rearranged into descending order by use of a conventional automatic sorter. The computing process can be resumed without significant loss of time by simply modifying the program of FIG. 8 so that instead of their initial values K(J) = J, the various indices of the DO loop nest each begin with their respective values K(J) punched-out just before the computer was arbitrarily stopped. The sorted interim results may then be put to partially-optimum use, while the computing process continues.

Finally, it will be seen that the program illustrated in FIG. 8 can easily be changed to accommodate fewer or more vectors in the original collection, as well as fewer or more vectors in the subset. For example, if the original collection consists of only nine vectors of four elements each, then a nest of only four DO loops is required, and a total of only $C_4^9 = (9!)/[(4!)(5!)] = 126$ computed determinants is exhaustive.

While the invention has been described with a certain degree of particularity, it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed:

1. A stimulus interpreter comprising:
a. central memory means for storing a plurality of N-element reference vectors;
b. central memory means for storing a plurality of N-element tolerance vectors related to said plurality of reference vectors in such a way that each element of a particular tolerance vector is a measure respectively of the degree of uncertainty in the corresponding element of its related reference vector;
c. means to read out of said memories the vectors stored therein;
d. input means to present a plurality of N positive analog signal voltages to a corresponding plurality of N input terminals, said plurality of voltages comprising a stimulus vector;
e. comparison means for determining the degree of similarity between said stimulus vector and a particular one of said reference vectors held in memory;
f. said comparison means comprising in series connected relation:
hybrid comparator means;
analog voltage integrator means;
analog negative-exponential means;
sample and hold means; and
g. means for presenting in serial form the elements of the output response vector resulting from said comparison means.

2. The stimulus interpreter of claim 1 including multiplexer means interposed between said input means and said comparison means.

3. The stimulus interpreter of claim 1 including control-logic means to coordinate the synchronous retrieval of the successive pairs of elements of the successive pairs of the associated reference and tolerance vectors from said memory, while cyclically changing the address of the sampled input terminal.

4. The stimulus interpreter of claim 1 in which said hybrid comparator means comprises:
a. digital-to-analog converter means;
b. absolute differencing means comprising a differential amplifier in series with a full wave rectifier;
c. hybrid division loop means comprising a two-input analog voltage summing means; and
d. multiple input analog voltage summing means, said multiple inputs being weighted in accordance with the voltage outputs of a binary number register.

5. The stimulus interpreter as in claim 4 in which said means for presenting in serial form comprises:
a. analog output terminal means to display serially the elements of the output response vector;
b. first pulse means to present an alert pulse at the time of the start of the self-sustained sequence of events comprising the interpreting operations on the elements of the stimulus vector applied to the input terminals;
c. second pulse means to present a flag pulse at the time that all of the elements of the response vector have been generated and presented to said analog output terminal; and
d. third pulse means to present an end pulse just prior to the atuomatic termination of the self-sustained sequence of events which comprise the interpretation of the stimulus vector.

6. The stimulus interpreter as in claim 5 including response interpreter means, comprising:
a. analog gate means;
b. sample and hold means;
c. analog comparator means connected across the input of said analog gate means which is in series with said sample and hold means, and the output of said sample and hold means;
d. six bit counter means responsive to said stimulus interpreter;
e. first six path gate means responsive to said analog comparator;
f. six bit register means responsive to said first six path gate means;
g. second six path gate means responsive to said six bit register means; and
h. decision output indicator means.

7. The stimulus interpreter as in claim 6 including stimulus indentifier means adapted to accept simultaneously a plurality of N analog voltages representing the N elements of a stimulus vector inputted to said identifier, and to deliver a single analog output voltage, comprising:
a. summing means comprising amplifier means and a plurality of diodes connected the input of said amplifier means and to each of said N analog voltages, to provide a first sum voltage;
b. a plurality of N networks each having two inputs and one input, one of said inputs of each of said networks connected to one of said analog voltages, respectively, the second input of each of said networks connected to said first sum voltage; and
c. the outputs of each of said networks added together and applied to second amplifier means, the output of which comprises the analog output of said stimulus identifier.

8. A stimulus interpreter comprising:
a. central memory means for storing a plurality of N element reference vectors;
b. central memory means for storing a plurality of N element tolerance vectors related to said plurality of reference vectors in such a way that each element of a particular tolerance vector is a measure respectively of the degree of uncertainty in the corresponding element of its related reference vector;
c. means to read out of said memories the vectors stored therein;
d. input means to present a plurality of N positive analog signal voltages to a corresponding plurality of N input terminals, said plurality of voltages comprising a stimulus vector;
e. comparison means for determining the similarity between said stimulus vector and a particular one of said reference vectors held to memory, said comparison means comprising in series connected relation:
hybrid comparator means;
analog voltage integrator means;
analog negative exponential means;
sample and hold means;
f. the said hybrid comparator means comprising:
digital-to-analog converter means;
absolute differencing means comprising a differential amplifier in series with a full wave rectifier;
hybrid division loop means comprising a two-input analog voltage summing means; and
multiple input analog voltage summing means; and
multiple input analog voltage summing means, said multiple inputs being weighted in accordance with the voltage outputs of a binary number register;
g. means for presenting in serial form the elements of the output response rector resulting from said comparison means including:
analog output terminal means to display serially the elements of the output response vector;
first pulse means to present an alert pulse at the time of start of the self-sustained sequence of events comprising the interpreting operations on the elements of the stimulus vector applied to the input terminals;
second pulse means to present a flag pulse at the time that all of the elements of the response vector have been generated and presented to said analog output terminal; and
third pulse means to present an end pulse just prior to the automatic termination of the self-sustained sequence of events which comprised the interpretation of the stimulus vector;
h. response interpreter means, comprising:
analog gate means;
sample and hold means connected in series with said analog gate means;
analog comparator means connected between the input and the output of said series connected analog gate means and sample and hold means;
six bit counter means responsive to said stimulus interpreter means;
first six path gate means responsive to said analog comparactor;
six bit register means responsive to said first six path gate means;
second six path gate means responsive to said six bit register means; and
decision output indicator means;
i. stimulus identifier means comprising:
summing means comprising amplifier means and a plurality of diodes connected to the input of said amplifier means and to each of said analog voltages to provide a first sum voltage;
a plurality of N networks, each having two inputs and one output, one of said inputs of each of said networks connected to one of said analog voltages, respectively, the second input of each of said networks connected to said first sum voltage; and
the outputs of each of said networks added together and applied to second amplifier means, the output of which comprises the analog output of said stimulus identifier.

* * * * *